(12) United States Patent (10) Patent No.: US 8,468,417 B2
Asnaashari et al. (45) Date of Patent: Jun. 18, 2013

(54) DATA INTEGRITY IN MEMORY CONTROLLERS AND METHODS

(75) Inventors: Mehdi Asnaashari, Danville, CA (US); Ronald Yamada, Santa Clara, CA (US); Siamack Nemazie, Los Altos Hills, CA (US); Jui-Yao ("Ray") Yang, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 1096 days.

(21) Appl. No.: 12/388,305

(22) Filed: Feb. 18, 2009

(65) Prior Publication Data

US 2010/0211834 A1 Aug. 19, 2010

(51) Int. Cl.
*H03M 13/00* (2006.01)

(52) U.S. Cl.
USPC .......................................... 714/758; 702/189

(58) Field of Classification Search
USPC ... 714/758, 800, 801, 802, 803, 804; 702/189
See application file for complete search history.

(56) References Cited

U.S. PATENT DOCUMENTS

| | | | |
|---|---|---|---|
| 5,257,391 A | 10/1993 | DuLac et al. | |
| 7,398,449 B1 | 7/2008 | Normoyle et al. | |
| 8,209,593 B2 | 6/2012 | Park et al. | |
| 2002/0124129 A1 | 9/2002 | Zilberman | |
| 2004/0042244 A1 | 3/2004 | Kim et al. | |
| 2006/0045273 A1* | 3/2006 | Mayer | 380/277 |
| 2006/0098320 A1 | 5/2006 | Koga et al. | |
| 2006/0117189 A1 | 6/2006 | Chiu et al. | |
| 2006/0136619 A1 | 6/2006 | Edirsooriya et al. | |
| 2006/0294299 A1 | 12/2006 | Edirsooriya | |
| 2007/0028140 A1 | 2/2007 | Takeda | |
| 2008/0104480 A1 | 5/2008 | Tseng et al. | |

FOREIGN PATENT DOCUMENTS

| | | |
|---|---|---|
| KR | 10-0753174 B1 | 8/2007 |
| WO | 97-24642 A1 | 7/1997 |

OTHER PUBLICATIONS

NN8801324:"Apparatus for Detection and Isolation of Failures,"IBM Tech. Disclosure; vol. 30, Issue 8, pp. 1-4; Jan. 1, 1988.*
International Search Report and Written Opinion for related PCT Application PCT/US2010/000412, mailed Sep. 29, 2010 (12 pgs.).
Intel. "Serial ATA Advanced Host Controller Interface (AHCI) 1.3 Specification," ratified Jun. 26, 2008, accessed Feb. 11, 2009 at http://download.intel.com/technology/serialata/pdf/rev1_3.pdf. (131 pgs.)

(Continued)

*Primary Examiner* — Guy Lamarre
(74) *Attorney, Agent, or Firm* — Brooks, Cameron & Huebsch, PLLC

(57) ABSTRACT

The present disclosure includes methods, devices, and systems for data integrity in memory controllers. One memory controller embodiment includes a host interface and first error detection circuitry coupled to the host interface. The memory controller can include a memory interface and second error detection circuitry coupled to the memory interface. The first error detection circuitry can be configured to calculate error detection data for data received from the host interface and to check the integrity of data transmitted to the host interface. The second error detection circuitry can be configured to calculate error correction data for data and first error correction data transmitted to the memory interface and to check integrity of data and first error correction data received from the memory interface.

54 Claims, 4 Drawing Sheets

OTHER PUBLICATIONS

Erickson, Chris. "An Overview of Serial ATA Technology," accessed at http://www.eng.auburn.edu/~xugeful/D&TSeminar/files/Serial%20ATA%20Technology_Final_9_27_06.ppt#258,1,An Overview of Serial ATA Technology. (46 pgs.)

Kawamoto, Masakazu. "HDD Interface Technologies," Fujitsu Sci. Tech. J. 42, 1, pp. 78-92, Jan. 2006.

European Search Report for related European Application No. 10744045.5, mailed Oct. 4, 2012, (5 pgs.).

Notice of Preliminary Rejection for related Korean Application No. 10-2011-7021511, mailed Feb. 27, 2013, (13 pgs.).

* cited by examiner

DATA INTEGRITY IN MEMORY CONTROLLERS AND METHODS

TECHNICAL FIELD

The present disclosure relates generally to semiconductor memory devices, methods, and systems, and more particularly, to data integrity.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored information when not powered and can include NAND flash memory, NOR flash memory, read only memory (ROM), Electrically Erasable Programmable ROM (EEPROM), Erasable Programmable ROM (EPROM), and phase change random access memory (PCRAM), among others.

Memory devices can be combined together to form a solid state drive (SSD). An SSD can include non-volatile memory, e.g., NAND flash memory and NOR flash memory, and/or can include volatile memory, e.g., DRAM and SRAM, among various other types of non-volatile and volatile memory.

An SSD can be used to replace hard disk drives as the main storage device for a computer, as the SSD can have advantages over hard drives in terms of performance, size, weight, ruggedness, operating temperature range, and power consumption. For example, SSDs can have superior performance when compared to magnetic disk drives due to their lack of moving parts, which may avoid seek time, latency, and other electro-mechanical delays associated with magnetic disk drives. SSD manufacturers can use non-volatile flash memory to create flash SSDs that may not use an internal battery supply, thus allowing the drive to be more versatile and compact.

An SSD can include one or more memory devices, e.g., one or more memory chips. As one of ordinary skill in the art will appreciate, a memory chip can include one or more dies. Each die can include one or more memory arrays and peripheral circuitry thereon. A memory array can include one or more planes, with each plane including one or more physical blocks of memory cells. Each physical block can include one or more pages of memory cells that can store one or more sectors of data.

SSDs can interface with a host system with a serial interface such as universal serial bus (USB), serial advanced technology attachment (SATA), or peripheral component interconnect express (PCIe), among others. Serial interfaces such as USB, SATA, and PCIe may have error detection mechanisms such as cyclic redundancy check (CRC) built into the link layer or transport layer of the architecture of the respective interfaces. CRC may include the ability to detect the presence of errors caused by noise or other impairments during transmission of data from a transmitter to a receiver. CRC data generation may be based on a frame structure supported by a particular interface.

For example, a SATA frame structure may include a start-of-frame (SOF), followed by a frame information structure (FIS), followed by CRC data, and followed by an end-of-frame (FOF). SATA may use 32-bits of CRC data calculated over the contents of the FIS. An example of a 32-bit CRC polynomial used in the calculation of CRC data is: $X^{32}+X^{26}+X^{23}+X^{22}+X^{16}+X^{12}+X^{11}+X^{10}+X^8+X^7+X^5+X^4+X^2+X+1$. In the event that the FIS contains an odd number of words, e.g., 16 bit segments, the last word of the FIS may be padded with zeros to form a full double word (dword), e.g., 32 bits. A SATA frame may include 2064 dwords including the FIS and CRC data, wherein the FIS payload may include 2048 dwords (8192 bytes). However, the payload may include less data.

As one of ordinary skill in the art will appreciate, logical block addressing is a scheme that can be used by a host for identifying a sector of information, e.g., each sector can correspond to a unique logical block address (LBA). A sector may be the smallest addressable portion of a storage volume. As an examples a sector of data can be a member of bytes of data, e.g., 512 bytes. Because each payload at a serial host interface, e.g., a SATA interface, does not necessarily include the same number of bytes, and because payloads at a serial host interface of a mass storage device may be of different units, the CRC data may not propagate past the host interface, e.g., the link or transport layer of the host interface.

DETAILED DESCRIPTION

Figure 1:
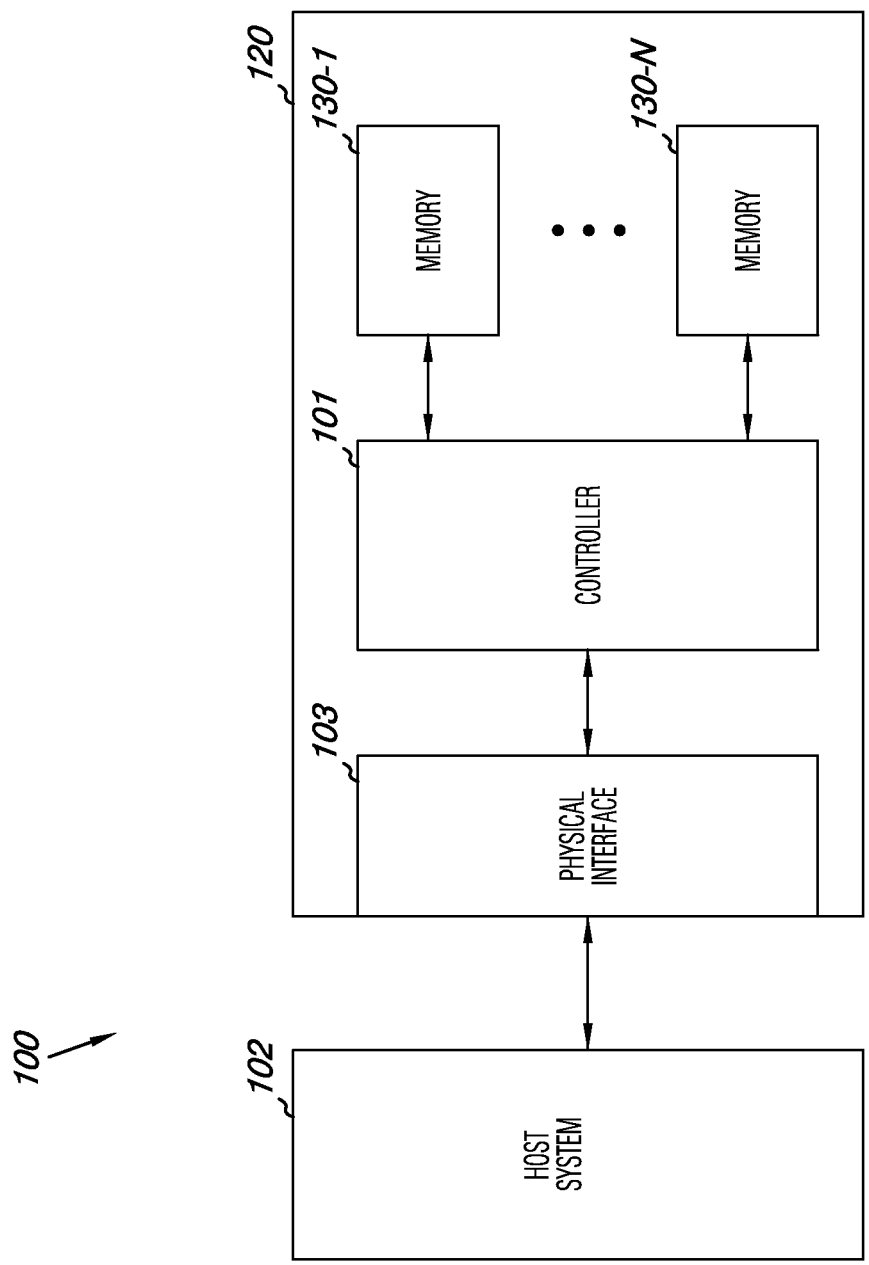
FIG. 1 is a functional block diagram of a computing system including a memory system in accordance with one or more embodiments of the present disclosure.

The present disclosure includes methods, devices, and systems for data integrity in memory controllers. One memory controller embodiment includes a host interface and first error detection circuitry coupled to the host interface. The memory controller can include a memory interface and second error detection circuitry coupled to the memory interface. The first error detection circuitry can be configured to calculate error detection data for data received from the host interface and to check the integrity of data transmitted to the host interface. The second error detection circuitry can be configured to calculate error correction data for data and first error correction data transmitted to the memory interface and to check integrity of data and first error correction data received from the memory interface.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designator "N," particularly with respect to reference numerals in the drawings, indicates that a number of the particular feature so designated can be included with one or more embodiments of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

FIG. 1 is a functional block diagram of a computing system 100 including a memory system 120 in accordance with one or more embodiments of the present disclosure. In the embodiment illustrated in FIG. 1, the memory system 120, e.g., a solid state drive (SSD), can include a memory controller 101, a physical interface 103, and one or more solid state memory devices 130-1, ... 130-N, e.g., NAND flash devices. As illustrated in FIG. 1, the memory controller 101 can be coupled to the physical interface 103 and to the solid state memory devices 130-1, ..., 130-N.

The physical interface 103 can be used to communicate information between the memory system 120 and another device such as a host system 102. Host system 102 can include a memory access device, e.g., a processor. One of ordinary skill in the art will appreciate that "a processor" can intend one or more processors, such as a parallel processing system, a number of coprocessors, etc. Examples of host systems include laptop computers, personal computers, digital cameras, digital recording and playback devices, mobile telephones, PDAs, memory card readers, interface hubs, and the like. For one or more embodiments, the physical interface 103 can be in the form of a standardized physical interface. For example, when the memory system 120 is used for data storage in a computing system 100, the physical interface 103 can be a serial advanced technology attachment (SATA), peripheral component interconnect express (PCIe), or a universal serial bus (USB), among other physical interfaces. In general, however, physical interface 103 can provide a physical connection for passing control, address, data, and other signals between a host interface, e.g., host interface 210 in FIG. 2, of the controller 101 of the memory system 120 and a host system 102 having compatible receptors for the physical interface 103.

The memory controller 101 can communicate with the solid state memory devices 130-1, ..., 130-N to read, write, and erase data, among other operations. Memory controller 101 can have circuitry that may be one or more integrated circuits and/or discrete components. For one or more embodiments, the circuitry in memory controller 101 may include control circuitry for controlling access across the solid state memory devices 130-1, ..., 130-N and circuitry for providing a translation layer between a host system 102 and the memory system 120. Thus, a memory controller could selectively couple an I/O connection (not shown in FIG. 1) of a solid state memory device 130-1, ..., 130-N to receive the appropriate signal at the appropriate I/O connection at the appropriate time. Similarly, the communication protocol between a host system 102 and the memory system 120 may be different than what is required for access of a solid state memory device 130-1, ..., 130-N. Memory controller 101 could then translate the commands received from a host into the appropriate commands to achieve the desired access to a solid state memory device 130-1, ..., 130-N.

The embodiment of FIG. 1 can include additional circuitry that is not illustrated so as not to obscure embodiments of the present disclosure. For example, the memory system 120 can include address circuitry to latch address signals provided over I/O connections through I/O circuitry. Address signals can be received and decoded by a row decoder and a column decoder to access the solid state memory devices 130-1, ..., 130-N. It will be appreciated by those skilled in the art that the number of address input connections can depend on the density and architecture of the solid state memory devices 130-1, ..., 130-N.

Figure 2:
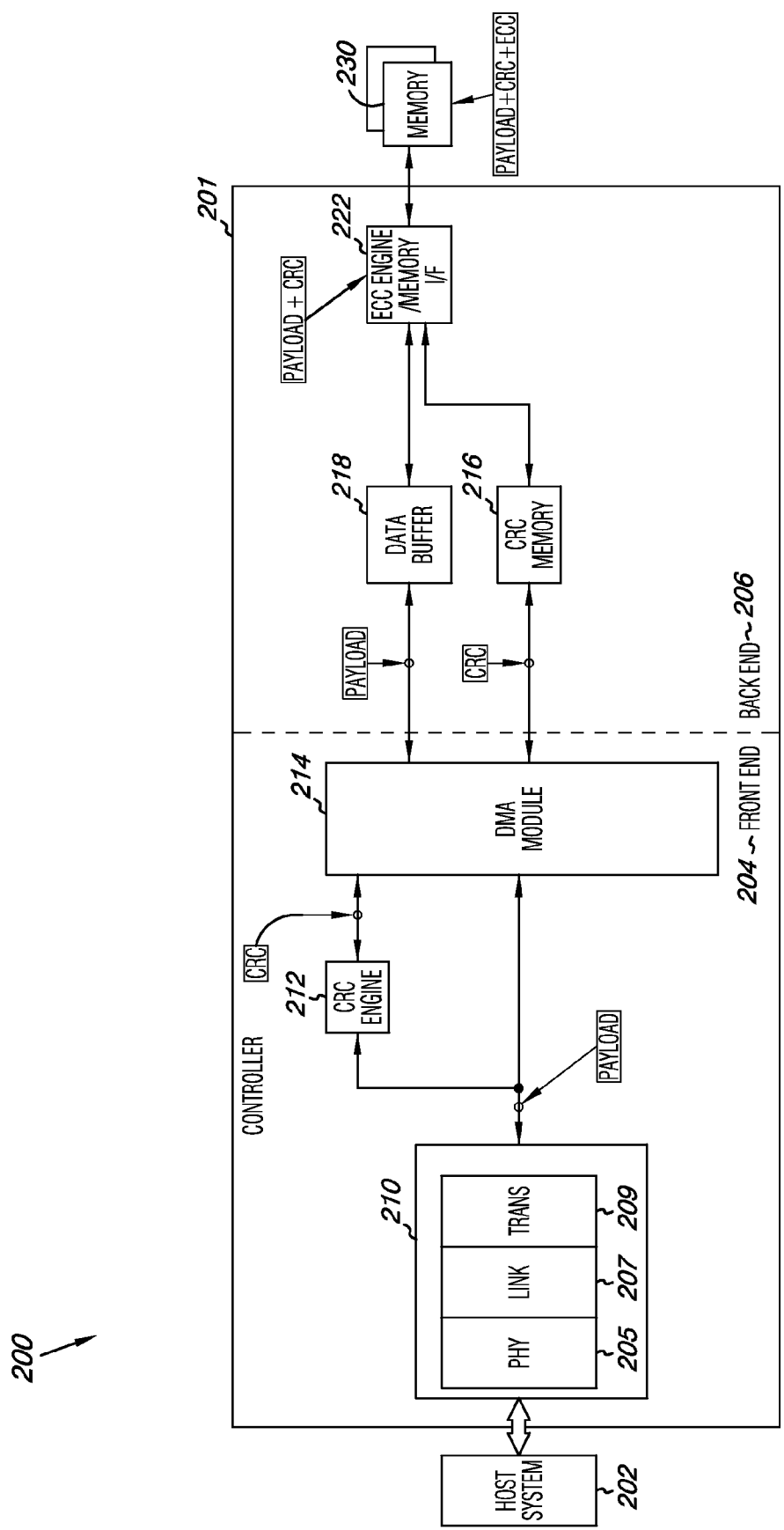
FIG. 2 is a functional block diagram of a system including a memory controller in accordance with one or more embodiments of the present disclosure.

FIG. 2 is a functional block diagram of a system 200 including a memory controller 201 in accordance with one or more embodiments of the present disclosure. Controller 201 can be analogous to controller 101 illustrated in FIG. 1. In one or more embodiments, controller 201 can be a component of a memory system, such as an SSD. It will be appreciated by one of ordinary skill in the art that additional circuitry and components can be provided beyond those illustrated in FIG. 2, and that the controller detail of FIG. 2 has been reduced to facilitate ease of illustration.

As shown in FIG. 2, memory controller 201 can be coupled to one or more solid state memory devices 230. The solid state memory devices 230 can be analogous to solid state memory devices 130-1, ..., 130-N, illustrated in FIG. 1. Controller 201 can include a front end portion 204 and a back end portion 206. The memory controller can include a number of front end components coupled between a host interface 210 and data transfer circuitry, e.g., a direct memory access (DMA) module 214. The memory controller can also include a number of back end components coupled between the DMA module 214 and a memory interface, e.g., a memory interface component of error detection circuitry/memory interface (I/F) 222. In one or more embodiments, the error detection circuitry component of the error detection circuitry/memory I/F 222 can be an error correction code (ECC) engine. In general, the memory controller 201 can process commands and data received from or transferred to a host system 202, e.g., host system 102 in FIG. 1, with the front end 204. In general, the memory controller 201 can manage communications with the solid state memory devices 230 to read, write, and erase data, among other operations, on the solid state memory devices 230 with the back end 206. However, certain aspects of command processing and memory communication management can be handled by the controller 201 on either or both of the front end 204 and back end 206. As illustrated in FIG. 2, the host interface 210 and DMA module 214 can be front end components.

As shown in FIG. 2, the front end portion 204 can include a host interface 210 that can be coupled to a host system 202, e.g., host system 102 in FIG. 1. The host interface 210 can be configured to receive data from the host system. The data received from the host interface can be a data payload including a number of sectors of data. In one or more embodiments, the data received from the host interface can be streaming data. The host interface 210 can interface with the host system 202 through a number of layers including a physical layer 205, a link layer 207, and a transport layer 209. One of ordinary skill in the art will appreciate that the number of layers for a particular host interface can be defined by an interface standard such as SATA, PCIe, USB, etc. As used herein, a transport layer can indicate at least a transport layer as part of a SATA standard or a transaction layer as part of a PCIe standard. One of ordinary skill in the art will appreciate that a transport layer according to a SATA standard can be analogous to a transaction layer according to a PCIe standard. Host interface 210 can be coupled to a physical interface, e.g., physical interface 103 illustrated in FIG. 1, on a memory system, e.g., an SSD, to communicate with a host system 202. Such detail is not shown in FIG. 2, for ease of illustration.

The host interface 210 can be coupled with a DMA module 214 and front end error detection circuitry, e.g., cyclic redundancy check (CRC) engine 212. Although illustrated as "CRC ENGINE" 212, error detection circuitry can provide functionality other than cyclic redundancy checks. For example, error detection circuitry can include repetition schemes, parity schemes, checksums, Hamming distance based checks, hash functions, horizontal and vertical redundancy checks, polarity schemes, and/or error correction schemes such as ECC, among others. In one or more embodiments, the host interface 210 can be directly coupled with the front end CRC engine 212 and directly coupled with the DMA module 214.

In one or more embodiments, the front end CRC engine 212 can be coupled to the host interface 210, and thus to the host system, by a link layer 207 and/or a transport layer 209. The front end error detection circuitry, e.g., CRC engine 212, can be configured to detect errors in data, e.g., while the data is in a memory system such as memory system 120 in FIG. 1. For example, the front end CRC engine 212 can calculate error correction data, e.g., CRC data, corresponding to data, e.g., a sector of a data payload such as a DMA payload, received from the link layer 207 and/or the transport layer 209, e.g., as part of a write operation. In one or more embodiments, the front end CRC engine 212 can calculate CRC data on a sector-by-sector basis. In one or more embodiments, the front end CRC engine 212 can be coupled to the host interface 210 by a link layer 207 and/or a transport layer 209 and receive a number of sectors of data, e.g., a DMA payload, from the link layer 207 and/or the transport layer 209. In one or more embodiments, the front end CRC engine 212 can receive the number of sectors of data from either the link layer 207 exclusively, or from the transport layer 209 exclusively. However, embodiments are so limited. CRC data that may have been generated by a host system 202 for data transferred to a memory controller 201 may be stripped from the data at a transport layer 209 for PCIe type interfaces or at a link layer 207 for SATA type interfaces. However, according to one or more embodiments of the present disclosure, the front end CRC engine 212 can calculate and check CRC data per sector of data received from a host interface 210, to which it can be coupled.

The DMA module 214 can be coupled to a back end data buffer 218 and a back end error detection memory, e.g., CRC memory 216. The back end data buffer 218 can be coupled to the ECC engine/memory I/F 222. The back end data buffer 218 can be configured to buffer at least a portion, e.g., a number of sectors of data, of a DMA payload received from DMA module 214 for the ECC engine/memory I/F 222 during a write operation. The back end data buffer 218 can be configured to buffer a number of sectors of data received from the ECC engine/memory I/F 222 during a read operation. The back end data buffer 218 and back end CRC memory 216 can be coupled to error detection circuitry, e.g., an ECC engine and memory interface. In one or more embodiments, and as illustrated in the embodiment of FIG. 2, the ECC engine and memory interface can be coupled together as one component, e.g., "ECC ENGINE/MEMORY I/F" 222. Reference herein collectively to an ECC engine/memory I/F does not exclude embodiments having error detection circuitry and memory interfaces as separate components. Likewise, reference herein to either component individually does not exclude embodiments where error detection circuitry and a memory interface are included as one component.

The back end CRC memory 216 can be configured to store CRC data calculated by the front end CRC engine 212. The back end CRC memory 216 can be coupled to an ECC engine/memory I/F 222 and be configured to receive and store CRC data from the memory interface portion of ECC engine/memory I/F 222, e.g., CRC data that had previously been stored in the solid state memory devices 230. The back end data buffer 218 can be configured to transfer a number of sectors of data received from an ECC engine/memory I/F 222 across the DMA module 214 to the front end CRC engine 212. The front end CRC engine 212 can be coupled to the error detection circuitry portion of the ECC engine/memory I/F 222, e.g., via the DMA module 214. The back end CRC memory 216 can be configured to transfer CRC data corresponding to the number of sectors of data received from the ECC engine/memory I/F 222 across the DMA module 214 to the front end CRC engine 212. In such an instance, the front end CRC engine 212 can be configured to calculate CRC data for a, e.g., each, sector of data received from the DMA module 214. The front end CRC engine can then compare the calculated CRC data for the sector of data received from the DMA module 214 to the CRC data received from the back end CRC memory 216 via the DMA module 214, e.g., to verify the integrity of the sector of data received from the DMA module 214 before the sector of data is transferred across the host interface 210 to a host system. Additional detail on the operation of a DMA module can be found in commonly assigned U.S. patent application Ser. No. 12/421,093, now U.S. Pat. No. 8,055,816, entitled "Memory Controllers, Memory Systems, Solid State Drives and Methods for Processing a Number of Commands."

The ECC engine/memory I/F 222 can be coupled to the solid state memory devices 230. In one or more embodiments, the ECC engine/memory I/F 222 can be configured to append CRC data, e.g., CRC data received from a back end CRC memory 216, to a corresponding sector of data. The ECC engine portion of the ECC engine/memory I/F 222 can be configured to detect errors in data, e.g., in a sector of data. In one or more embodiments, the ECC engine portion of the ECC engine/memory I/F 222 can be configured to detect and/or correct errors in data while the data is in a memory system such as memory system 120 in FIG. 1. For example, the ECC engine portion of the ECC engine/memory I/F 222 can calculate error correction data, e.g., ECC data, for data alone and/or for data and appended error detection, e.g., CRC, data. In one or more embodiments, the ECC engine portion of the ECC engine/memory I/F 222 can be configured to calculate ECC data on a sector-by-sector basis. The ECC engine/memory I/F 222 can be configured to append ECC data to a corresponding sector of data. In one or more embodiments, the ECC engine portion of the ECC engine/memory I/F 222 can be configured to calculate ECC data for a corresponding sector of data along with appended CRC data, e.g., CRC data calculated by the front end CRC engine 212. During read operations, the ECC engine portion of the ECC engine/memory I/F 222 can be configured to correct errors in a number of sectors of data while the number of sectors of data are in the back end data buffer 218. The ECC engine portion of the ECC engine/memory I/F 222 can be configured to correct errors in the CRC data while the CRC data is in the back end CRC memory 216. Embodiments are not limited to correcting errors in these particular locations.

In one or more embodiments, the memory controller 201 can be configured to transfer a number of sectors of data, corresponding calculated CRC data, and corresponding ECC data, or a different combination thereof, across the ECC engine/memory I/F 222, e.g., to the solid state memory devices 230 for a write operation. That is, the controller can be configured to store a sector of data, corresponding CRC data, and corresponding ECC data in a location in the solid state memory devices 230.

One or more embodiments can include the controller 201 receiving a number of sectors of data from a host system 202 with a link layer 207 and/or a transport layer 209 of a host interface 210, e.g., in conjunction with a write operation. The number of sectors of data can be transferred through a host interface 210 to a front end CRC engine 212 and a DMA module 214. In one or more embodiments, the number of sectors of data can be received in parallel with the front end CRC engine 212 and the DMA module 214. The front end CRC engine 212 can calculate CRC data corresponding to each of the number of sectors of data, e.g., each sector of data can correspond to unique CRC data. DMA module 214 can transfer the CRC data from CRC engine 212 to back end CRC memory 216. The front end CRC engine 212 can be coupled to the back end CRC memory 216, e.g., via the DMA module 214. In one or more embodiments, the back end CRC memory 216 can store the CRC data. The back end CRC memory 216 can store more than one unique CRC data where each unique CRC data can correspond to a particular sector of data. The DMA module 214 can transfer the number of sectors of data to the back end data buffer 218. The ECC engine/memory I/F 222 can transfer the number of sectors of data from the back end data buffer 218 and the corresponding CRC data from back end CRC memory 216, calculate unique ECC data for each of the number of sectors of data and the corresponding CRC data, append the ECC data to the corresponding sector of data, and store the sector of data, CRC data, and ECC data in the one or more solid state memory devices 230.

As noted above, CRC data can be calculated on the contents of a frame information structure (FIS) in dword (32 bit) quantities, among other CRC computational methods. However, a data payload received from a host system 202 may include a number of sectors, e.g., 512 byte portions, of a data payload. According to some previous approaches, CRC data may be calculated for the data payload as a whole rather than for each sector of data included in the data payload. That is, even if CRC data propagates past the link layer 207 or the transport layer 209, the CRC data may not be useful for a particular sector of data at least partially because data may be transferred to and/or from a memory system, e.g., memory system 120 in FIG. 1, in quantities different from the quantities in which it is written to and/or read from a memory device, e.g., memory device 130-1 in FIG. 1. Thus, using the same CRC data for a data payload as for a number of sectors of data associated with a read and/or write operation, even for the same data, may not provide data integrity for the number of sectors of data.

In contrast, according to one or more embodiments of the present disclosure CRC data is calculated for each sector of data on a sector by sector basis, e.g., unique CRC data can be calculated for each sector of data. For example, if a data payload comprises 2048 bytes, CRC data can be calculated for each of four 512 byte sectors of data. Data integrity can be provided for the number of sectors from the point it is received by the controller 201 from the host system 202 at the front end 204, e.g., at the host interface 210, to the point where it is transferred from the back end 206 to the solid state memory devices 230. Providing data integrity can include maintaining the same CRC data for a sector of data from the host interface 210 to the ECC engine/memory I/F 222 and/or to the solid state memory devices 230.

In one or more embodiments, ECC engine/memory I/F 222 can receive a number of sectors of data, their corresponding first CRC data, and FCC data from one or more solid state memory devices 230, e.g., in conjunction with a read operation. The ECC engine/memory I/F 222 can store the number of sectors of data in the back end data buffer 218 and store their corresponding CRC data in back end CRC memory 216. The number of sectors of data and their corresponding first CRC data and ECC data can be error checked with an ECC engine portion of an ECC engine/memory I/F 222. One or more errors identified by the ECC engine portion of the ECC engine/memory I/F 222 in the CRC data can be corrected while the CRC data is stored in the back end CRC memory 216. One or more errors identified by the ECC engine portion of the ECC engine/memory I/F 222 in the number of sectors of data can be corrected while the number of sectors of data are buffered in back end data buffer 218. After error correction, the DMA module 214 can receive and transfer the number of sectors of data and their corresponding CRC data to the front end CRC engine 212. The front end CRC engine 212 can calculate second CRC data for the number of transferred sectors of data and compare the first CRC data with the corresponding second CRC data to verify the integrity of the number of sectors of data. After comparing the first CRC data with the second CRC data, the number of sectors of data can be transferred across a transport layer 209 of host interface 210, e.g., to a host system 202 that requested data, e.g., the number of read sectors of data. In one or more embodiments, the number of sectors of data can be transferred across the host interface 210 without either the first CRC data or the second CRC data. In one or more embodiments, the ECC engine/memory I/F 222 can remove ECC data from the number of sectors of data and transfer the number of sectors of data and first CRC data in parallel to a front end CRC engine 212.

According to one or more embodiments of the present disclosure, such as the read operation described above, data integrity can be provided for the number of sectors of data. That is, data integrity can be provided for the number of sectors of data from the point is the number of sectors are received by the back end 206 of controller 201 from the solid state memory devices 230, e.g., at ECC engine/memory I/F 222, to the point where the number of sectors are transferred across the host interface 210, e.g., from the front end 204 to a host system 202. Providing data integrity can include maintaining the same CRC data from the solid state memory devices 230 to the host interface 210.

Figure 3:
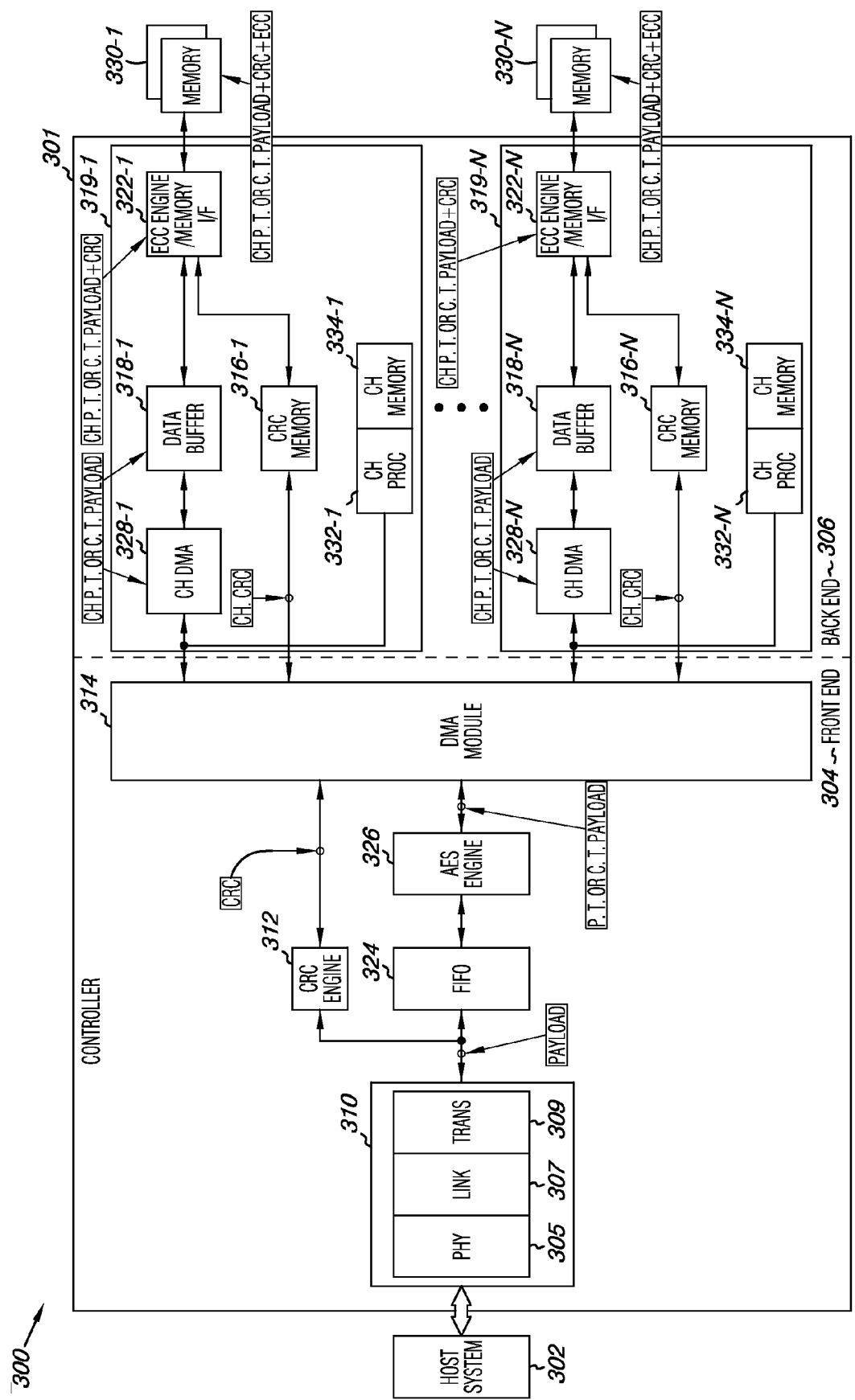
FIG. 3 is a functional block diagram of a system including a memory controller in accordance with one or more embodiments of the present disclosure.

FIG. 3 is a functional block diagram of a system 300 including a memory controller 301 in accordance with one or more embodiments of the present disclosure. Controller 301 can be analogous to controller 101 illustrated in FIG. 1. In one or more embodiments, controller 301 can be a component of a memory system, such as an SSD. It will be appreciated by those skilled in the art that additional circuitry and components can be provided beyond those illustrated in FIG. 3, and that the controller detail of FIG. 3 has been reduced to facilitate ease of illustration.

The embodiment illustrated in FIG. 3 includes components that can be analogous to those illustrated in FIG. 2 including host interface 310 with physical layer 305, link layer 307, and transport layer 309, as well as front end error detection circuitry, e.g., CRC engine 312, and data transfer circuitry, e.g., DMA module 314. However, in one or more embodiments, the host interface 310 can be coupled to the DMA module via a front end host buffer 324, e.g., FIFO 324 as shown, and encryption circuitry, e.g., advanced encryption standard (AES) engine 326. Although illustrated as "AES ENGINE"

326, other forms of encryption may be used with one or more embodiments of the present disclosure. FIFO 324 can be configured to buffer a DMA payload between a host interface 310 and an AES engine 326. Although not illustrated in FIG. 3, the AES engine 326 can include or be coupled to an AES buffer separate from the FIFO 324.

As illustrated in FIG. 3, the AES engine 326 may be configured to receive a number of sectors of data, e.g., a data payload (DMA payload) such as a data stream derived from a number of data packets received by the controller 301. Prior to encryption, the number of sectors of data can be plaintext (P.T.). The AES engine 326 may be arranged and configured to process the number of sectors of data optionally to provide an encrypted output, e.g., ciphertext (C.T.) to the DMA module 314. In one or more embodiments the AES engine 326 can process the number of sectors of data optionally, meaning that the AES engine can encrypt the number of sectors of data from plaintext to ciphertext, or the AES engine 326 can transfer the number of sectors of data to the DMA module 314 without encryption, e.g., in plaintext.

In one or more embodiments, a number of sectors of data received from a host system via host interface 310 can be received in parallel with the front end CRC engine 312 and the front end host buffer 324, e.g., FIFO 324 as shown. The number of sectors of data can be transferred from the host buffer 324 to the AES engine 326, where the number of sectors of data can be encrypted from plaintext to ciphertext. After encryption, the number of sectors of data can be transferred from the AES engine 326 to a DMA module 314 for further processing. Additional examples of the operation of encryption engines are described in more detail in commonly assigned U.S. patent application Ser. No. 12/333,822, entitled "Parallel Encryption/Decryption", having at least one common inventor.

The DMA module 314 effectively couples the front end 304 circuitry to the back end 306 circuitry. In one or more embodiments, the back end portion 306 of controller 301 can include more than one back end channel. In the embodiment illustrated in FIG. 3, the controller 301 includes a number of back end channels 319-1, . . . , 319-N. Each back end channel 319-1, . . . , 319-N can include a channel processor, 332-1, . . . , 332-N, and channel memory, 334-1, . . . , 334-N. The back end channel processors 332-1, . . . , 332-N and memories 334-1, . . . , 334-N, can be coupled to the DMA module 314 and to the back end channel DMA modules 328-1, . . . , 328-N. Each back end channel 319-1, . . . , 319-N can include back end channel data transfer circuitry, e.g., channel DMA modules 328-1, . . . , 328-N, which can be coupled to the DMA module 314. The DMA module 314 can be configured to direct commands associated with a DMA payload to a respective back end channel processor, e.g., back end channel processor 332-1, and to direct data associated with a DMA payload to a respective back end channel DMA module, e.g., back end channel DMA module 328-1. Example operations of channel processors are described in more detail in commonly assigned U.S. patent application Ser. No. 12/351,206, entitled "Modifying Commands", having at least one common inventor.

The back end portion 306 of the controller 301 can include components analogous to those illustrated in FIG. 2. For example, each back end channel 319-1, . . . , 319-N can include a back end data buffer 318-1, . . . , 318-N, back end error detection memory, e.g., CRC memory 316-1, . . . , 316-N, and ECC engines/memory interfaces 322-1, . . . , 322-N. In one or more embodiments, and as illustrated in the embodiment of FIG. 3, the ECC engine and memory interface can be coupled together as one component, e.g., "ECC ENGINE/MEMORY I/F" 322. In one or more embodiments, the ECC engine and memory interface can be separate components. As illustrated in FIG. 3, the back end data buffers 318-1, . . . , 318-N can be coupled between the back end channel DMA modules 328-1, . . . , 328-N and the ECC engines/memory interfaces 322-1, . . . , 322-N. Furthermore, the back end CRC memory 316-1, . . . , 316-N can be coupled between the DMA module 314 and the ECC engines/memory interfaces 322-1, . . . , 322-N. As shown in FIG. 3, a particular memory device, chip, array, etc., can correspond to a particular channel. For example, the solid state memory device(s) 330-1 can correspond to channel 319-1.

Figure 4:
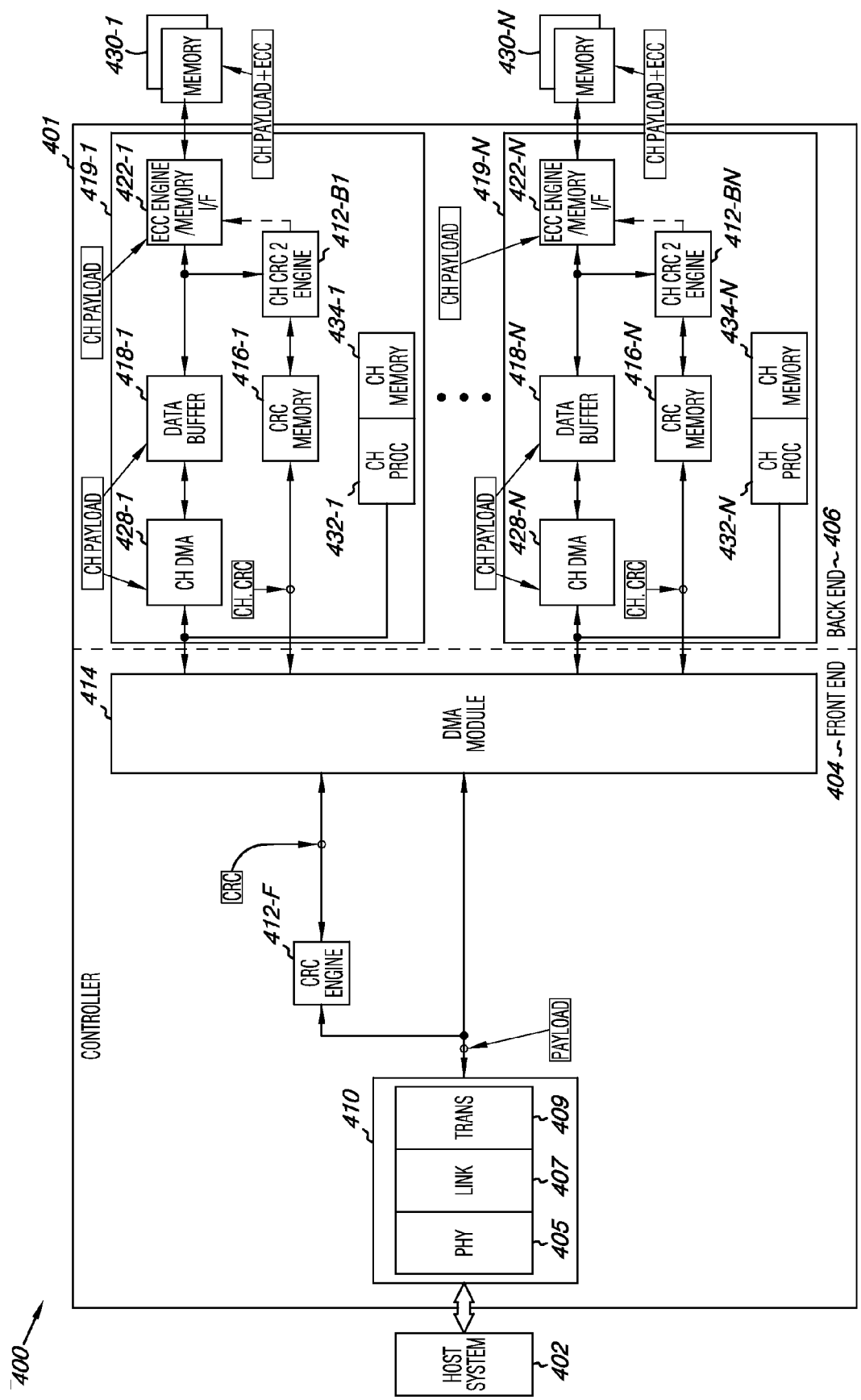
FIG. 4 is a functional block diagram of a system including a memory controller in accordance with one or more embodiments of the present disclosure.

FIG. 4 is a functional block diagram of a system 400 including a memory controller 401 in accordance with one or more embodiments of the present disclosure. Controller 401 can be analogous to controller 101 illustrated in FIG. 1. In one or more embodiments, controller 401 can be a component of a memory system, such as an SSD. It will be appreciated by those skilled in the art that additional circuitry and components can be provided beyond those illustrated in FIG. 4, and that the detail of controller 401 in FIG. 4 has been reduced to facilitate ease of illustration.

The embodiment illustrated in FIG. 4 includes components that can be analogous to those illustrated in FIG. 3 including front end 404 components of controller 401 such as host interface 410 including physical layer 405, link layer 407, and transport layer 409, as well as front end error detection circuitry, e.g., CRC engine 412-F, and data transfer circuitry, e.g., DMA module 414. The controller 401 also includes a number of back end 406 components that can be analogous to those illustrated in FIG. 3 such as back end channels 419-1, . . . , 419-N, including back end channel processors 432-1, . . . , 432-N and memory 434-1, . . . , 434-N, back end channel data transfer circuitry, e.g., channel DMA modules 428-1, . . . , 428-N, back end data buffers 418-1, . . . , 418-N, error detection circuitry, e.g., ECC engines/memory interfaces 422-1, . . . , 422-N, and back end error detection memory, e.g., CRC memory 416-1, . . . , 416-N. In one or more embodiments, and as illustrated in FIG. 4, the ECC engine and memory interface can be coupled together as one component, e.g., "ECC ENGINE/MEMORY I/F" 422. In one or more embodiments, the ECC engine and memory interface can be separate components. As illustrated in FIG. 4, each channel 419-1, . . . , 419-N can be coupled to one or more solid state memory devices 430-1, . . . , 430-N by the ECC engines/memory interfaces 422-1, . . . , 422-N.

However, in one or more embodiments, back end channels 419-1, . . . , 419-N can include a back end error detection circuitry, e.g., back end CRC engine 412-B1, . . . , 412-BN coupled to the back end CRC memory 416-1, . . . , 416-N. A back end CRC engine 412-B1, . . . , 412-BN can be configured to calculate error detection data, e.g., "second" CRC data, for corresponding data, e.g., a corresponding sector of data. In one or more embodiments, the corresponding data can be at least a portion of a DMA payload. The front end CRC engine 412-F can calculate "first" CRC data for a sector of data. A back end CRC engine 412-B1, . . . , 412-BN can be configured to compare the first CRC data with the second CRC data to check and/or verify the integrity of the sector of data. For example, the DMA module 414 can be coupled to the front end CRC engine 412-F and to the back end CRC memory 416-1, . . . , 416-N. The DMA module 414 can be configured to transfer the first CRC data to a back end CRC memory 416-1, . . . 416-N. Then a back end CRC engine 412-B1, . . . , 412-BN can compare the first CRC data received from a back end CRC memory 416-1, . . . , 416-N with the calculated second CRC data. Although a back end CRC engine 412-B1, ..., 412-RN is disclosed with respect to FIG. 4, which illustrates a controller 401 including multiple back end channels 419-1, ..., 419-N, embodiments are not so limited. For example, one or more embodiments of the present disclosure can include a memory controller with a single back end channel, e.g., as illustrated with respect to the back end 206 in FIG. 2, that includes a back end CRC engine.

A back end CRC engine 412-B1, ..., 412-BN can be coupled to an ECC engine/memory interface 422-1, ..., 422-N. In one or more embodiments, the back end CRC engine 412-B1, ..., 412-BN can be directly coupled to the ECC engine/memory I/F 422-1, ..., 422-N. The ECC engine portion of an ECC engine/memory I/F 422-1, ..., 422-N can be configured to calculate ECC data for a sector of data, e.g., a portion of a DMA payload received from a back end data buffer 418-1, ..., 418-N. In one or more embodiments, the controller 401 can be configured to transfer the sector of data and corresponding ECC data across the ECC engine/memory I/F 422-1, ..., 422-N without the first or the second corresponding CRC data. That is, in one or more embodiments, the sector of data and corresponding ECC data can be stored in the solid state memory devices 430-1, ..., 430-N without storing the corresponding CRC data in the solid state memory devices 430-1, ... 430-N. In one or more embodiments, the controller 401 can be configured to store the sector of data and the corresponding FCC data without the corresponding CRC data in a location in the solid state memory devices 430-1, ..., 430-N when a back end CRC engine 412-B1, ..., 412-BN verifies the integrity of the sector of data. That is, if a back end CRC engine 412-B1, ..., 412-BN does not verify the integrity of the sector of data, then the controller 401, in one or more embodiments, may not store the sector of data in the solid state memory devices 430-1, ..., 430-N.

One or more embodiments can include receiving a number of sectors of data with the front end CRC engine 412-F from a link layer 407 and/or a transport layer 409 of a host interface 410, e.g., in conjunction with a write operation. The front end CRC engine 412-F can be configured to calculate first CRC data for each sector of data. Accordingly, for the write operation, data integrity of the number of sectors of data can be maintained on the front end 404 of the controller 401 at least in part due to CRC data being calculated for the number of sectors of data before, or separate from, the performance of other operations on the number of sectors of data. The first CRC data can be transferred to the DMA module 414.

The DMA module 414 can transfer the number of sectors of data to a back end channel DMA module 428-1, ..., 428-N. In one or more embodiments, the DMA module 414 can transfer the number of sectors of data to a back end channel 419-1, ..., 419-N that corresponds to a memory address associated with the number of sectors of data, e.g., the channel coupled to the solid state memory device corresponding to the memory address. For example, the DMA module can transfer the number of sectors of data to back end channel DMA module 428-1 on channel 419-1 when a memory address associated with the number of sectors of data corresponds to a particular solid state memory device, e.g., 430-1. The number of sectors of data can be transferred from the back end channel DMA module 428-1, ..., 428-N to a back end data buffer 418-1, ..., 418-N. The back end data buffer 418-1, ..., 418-N can buffer the sector of data received from the back end channel DMA module 428-1, ..., 428-N during a write operation before the number of sectors of data are transferred to the FCC engine/memory interface 422-1, ..., 422-N and/or the back end CRC engine 412-B1, ..., 412-BN. In one or more embodiments, the number of sectors of data can be transferred in parallel from a back end data buffer 418-1, ..., 418-N to the back end CRC engine 412-B1, ..., 412-BN and to an ECC engine/memory I/F 422-1, ..., 422-N.

The DMA module 414 can transfer the first CRC data to back end CRC memory 416-1, ..., 416-N. In one or more embodiments, the DMA module 414 can transfer the first CRC data to a back end channel that corresponds to a memory address associated with the sector of data for which the first CRC data was calculated. The first CRC data can be stored in back end CRC memory 416-1, ..., 416-N before the back end CRC engine 412-B1, ..., 412-BN calculates second CRC data. A back end CRC engine 412-B1, ..., 412-BN can calculate second CRC data for the sector of data and compare the first CRC data with the second CRC data. Subsequent to the comparison, the sector of data can be stored in one or more solid state memory devices 430-1, ..., 430-N. In one or more embodiments, an ECC engine portion of an ECC engine/memory I/F 422-1, ..., 422-N can calculate ECC data for the sector of data after the comparison of first CRC data with second CRC data, but prior to the sector of data being stored in a solid state memory device 430-1, ..., 430-N. The ECC data can be appended to the sector of data before it is stored in a solid state memory device 430-1, ..., 430-N, such that the sector of data and the ECC data are stored, but neither the first nor the second CRC data are stored in a solid state memory device 430-1, ..., 430-N. Such embodiments can be beneficial at least partially due to a reduction in the amount of information stored in the solid state memory devices 430-1, ..., 430-N, e.g., when CRC data is not stored therein.

In one or more embodiments, the number of sectors of data are only transferred from the ECC engine/memory I/F 422-1, ..., 422-N to the solid state memory device 430-1, ..., 430-N if the back end CRC engine 412-B1, ..., 412-BN verifies the integrity of the number of sectors of data, e.g., if the first CRC data matches the second CRC data. Accordingly, for the write operation, data integrity of the number of sectors of data can be maintained on the back end 406 of the controller 401 at least in part due to second CRC data being calculated for the number of sectors of data after processing by the DMA module 414 and back end channel DMA module 428-1, ..., 428-N and compared to the first CRC data, which was calculated before, or separate from, the performance of other operations on the number of sectors of data. Thus, one or more embodiments of the present disclosure can provide data integrity for the number of sectors of data on the controller 401.

One or more memory system operation embodiments can include a read operation including reading a number of sectors of data and corresponding ECC data from one or more solid state memory devices 430-1, ..., 430-N. The number of sectors of data can be error checked with an ECC engine portion of an ECC engine/memory I/F 422-1, ..., 422-N. After error checking with the ECC engine portion of the ECC engine/memory I/F 422-1, ..., 422-N, the ECC data can be removed from the number of sectors of data. A back end CRC engine 412-B1, ..., 412-BN can calculate CRC data for each of the number of sectors of data. The number of sectors of data and the CRC data can be transferred in parallel, e.g., from the host buffer 424 and DMA module 414 respectively, to the front end CRC engine 412-F. The front end CRC engine 412-F can calculate CRC data for the each of the number of sectors of data and compare it to the CRC data calculated by the back end CRC engine to check the integrity of the number of sectors of data. The number of sectors of data can be transferred across a transport layer 409 of the host interface 410 after the comparison.

Accordingly, for the read operation, data integrity of a number of sectors of data can be maintained from the back end 406 of the controller 401 to the front end 404 at least in part due to calculating CRC data for each of the number of sectors of data after is the number of sectors of data are transferred from an ECC engine/memory I/F 422-1, . . . , 422-N. Furthermore, transferring previously calculated CRC data to the front end 404 of the controller 401 for comparison with newly calculated CRC data for a particular sector of data can help to verify that the integrity of the particular sector of data has been maintained. Thus, one or more embodiments of the present disclosure can provide data integrity for a number of sectors of data on the controller 401.

CONCLUSION

The present disclosure includes methods, devices, and systems for data integrity in memory controllers. One memory controller embodiment includes a host interface and first error detection circuitry coupled to the host interface. The memory controller can include a memory interface and second error detection circuitry coupled to the memory interface. The first error detection circuitry can be configured to calculate error detection data for data received from the host interface and to check the integrity of data transmitted to the host interface. The second error detection circuitry can be configured to calculate error correction data for data and first error correction data transmitted to the memory interface and to check integrity of data and first error correction data received from the memory interface.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. As used herein, the term "and/or" includes any and all combinations of one or more of the associated listed items.

It will be understood that, although the terms first, second, etc. may be used herein to describe various elements and that these elements should not be limited by these terms. These terms are only used to distinguish one element from another element. Thus, a first element could be termed a second element without departing from the teachings of the present disclosure.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A memory controller, comprising:
   a host interface;
   first error detection circuitry coupled to the host interface;
   a memory interface; and
   second error detection circuitry coupled to the memory interface;
   wherein the first error detection circuitry is configured to:
      calculate error detection data for data received from the host interface; and
      check integrity of data transmitted to the host interface; and
   wherein the second error detection circuitry is configured to:
      calculate error correction data for data and first error correction data transmitted to the memory interface; and
      check integrity of data and first error correction data received from the memory interface.

2. The memory controller of claim 1, wherein the first error detection circuitry is configured to calculate error detection data per received sector of data.

3. The memory controller of claim 2, wherein:
   the data received from the host interface comprises a data payload including a number of sectors of data; and
   the data received from the host interface comprises streaming data.

4. The memory controller of claim 1, wherein:
   the first error detection circuitry comprises a cyclic redundancy check (CRC) engine coupled to the host interface by a link layer and/or a transport layer; and
   the second error detection circuitry comprises an error correction code (ECC) engine.

5. The memory controller of claim 1, wherein the memory controller includes:
   data transfer circuitry coupled to the host interface and to the first and the second error detection circuitries; and
   error detection memory coupled to the data transfer circuitry;
   wherein the error detection memory is configured to store the error detection data.

6. The memory controller of claim 5, wherein the memory controller includes:
   a data buffer coupled to the data transfer circuitry and to the second error detection circuitry;
   wherein the data buffer is configured to buffer data for the second error detection circuitry.

7. The memory controller of claim 1, wherein the second error detection circuitry is configured to correct one or more errors in the data received from the memory interface.

8. The memory controller of claim 1, wherein the memory controller is configured to transfer the data received from the host interface, the error detection data, and the error correction data across the memory interface.

9. The memory controller of claim 1, wherein the memory controller includes:
   data transfer circuitry coupled to the memory interface and to the first and the second error detection circuitries;
   wherein the data transfer circuitry is configured to receive data and corresponding error detection data from the memory interface and to transfer the data and the corresponding error detection data to the first error detection circuitry.

10. The memory controller of claim 9, wherein the first error detection circuitry is configured to:
    calculate error detection data for the data received from the data transfer circuitry; and
    compare the calculated error detection data for the data received from the data transfer circuitry to the corresponding error detection data received from the data transfer circuitry.

11. The memory controller of claim 9, wherein the memory controller includes:
    more than one channel;
    channel data transfer circuitry coupled to the data transfer circuitry;
    a data buffer coupled to the channel data transfer circuitry and the second error detection circuitry; and
    error detection memory coupled to the memory interface.

12. The memory controller of claim 9, wherein the memory controller includes:
    more than one channel; and
    a channel processor and a channel memory.

13. The memory controller of claim 1, wherein the memory controller includes:
    a host buffer coupled to the host interface; and
    encryption circuitry coupled to the host buffer;
    wherein the encryption circuitry is configured to process the data optionally for providing an encrypted output.

14. The memory controller of claim 13, wherein the encryption circuitry comprises an advanced encryption standard (AES) engine.

15. A memory controller, comprising:
    a host interface;
    front end error detection circuitry coupled to the host interface;
    a memory interface; and
    back end error detection circuitry coupled to the memory interface;
    wherein the front end error detection circuitry is configured to calculate first error detection data for corresponding data; and
    wherein the back end error detection circuitry is configured to:
        calculate second error detection data for the corresponding data; and
        compare the first error detection data with the second error detection data to check integrity of the corresponding data.

16. The memory controller of claim 15, wherein the memory controller includes:
    data transfer circuitry coupled to the front end error detection circuitry;
    a back end error detection memory coupled to the data transfer circuitry and to the back end error detection circuitry;
    wherein the data transfer circuitry is configured to transfer the first error detection data from the front end error detection circuitry to the back end error detection memory; and
    wherein the back end error detection circuitry is configured to compare the first error detection data from the error detection memory with the second error detection data to check integrity of the corresponding data.

17. The memory controller of claim 15, wherein:
    the front end error detection circuitry comprises a cyclic redundancy check (CRC) engine;
    the back end error detection circuitry comprises a CRC engine; and
    wherein the memory controller includes an error correction code (ECC) engine coupled to the back end error detection circuitry and to the memory interface; and
    wherein the ECC engine is configured to calculate error correction data for the corresponding data.

18. The memory controller of claim 17, wherein the memory controller is configured to transfer the error correction data and the corresponding data across the memory interface without the first and/or the second error detection data.

19. The memory controller of claim 15, wherein:
    the corresponding data comprises a direct memory access (DMA) payload;
    the front end error detection circuitry is configured to calculate first error detection data per sector of the DMA payload; and
    the back end error detection circuitry is configured to calculate second error detection data per sector of the DMA payload.

20. A memory system, comprising:
    one or more solid state memory devices; and
    a memory controller coupled to the one or more solid state memory devices, wherein the memory controller includes:
        front end error detection circuitry configured to calculate first error detection data for a sector of data; and
        back end error detection circuitry configured to:
            calculate second error detection data for the sector of data; and
            check integrity of the sector of data; and
    wherein the memory controller is configured to store the sector of data without the first and/or the second error detection data in the one or more solid state memory devices.

21. The system of claim 20, wherein the back end error detection circuitry comprises a cyclic redundancy check (CRC) engine configured to compare the first error detection data with the second error detection data to check integrity of the sector of data.

22. The system of claim 20, wherein the system includes a physical interface coupled to a host interface of the memory controller.

23. The system of claim 22, wherein the front end error detection circuitry comprises a cyclic redundancy check (CRC) engine coupled to the host interface by a link layer and/or a transport layer.

24. The system of claim 22, wherein the physical interface comprises a serial interface selected from the group of serial interfaces including:
    universal serial bus (USB);
    serial advanced technology attachment (SATA); and
    peripheral component interconnect express (PCIe).

25. The system of claim 20, wherein the memory controller includes an error correction code (ECC) engine coupled to the back end error detection circuitry and to a memory interface, wherein the ECC engine is configured to calculate error correction data for the sector of data.

26. The system of claim 25, wherein the memory controller is configured to store the sector of data and the error correction data without the error detection data in the one or more solid state memory devices when the first error detection data matches the second error detection data.

27. The system of claim 20, wherein the front end error detection circuitry is configured to compare the first error detection data with the second error detection data to check integrity of the sector of data.

28. A method for operating a memory controller, comprising:
calculating, with first error detection circuitry, error detection data for data received from a host interface coupled to the first error detection circuitry;
checking integrity, with the first error detection circuitry, of data transmitted to the host interface;
calculating, with second error detection circuitry, error correction data for data and first error detection data transmitted to a memory interface coupled to the second error detection circuitry; and
checking integrity, with the second error detection circuitry, of data and first error correction data received from the memory interface.

29. The method of claim 28, wherein calculating the error detection data for the data received from the host interface comprises calculating error detection data per sector of data received from the host interface.

30. The method of claim 29, wherein:
the data received from the host interface comprises a data payload including a number of sectors of data; and
the data received from the host interface comprises streaming data.

31. The method of claim 28, wherein:
the first error detection circuitry comprises a cyclic redundancy check (CRC) engine coupled to the host interface by a link layer and/or a transport layer; and
the second error detection circuitry comprises an error correction code (ECC) engine.

32. The method of claim 28, wherein the method includes storing the error detection data in error detection memory coupled to data transfer circuitry, which is coupled to the host interface and to the first and the second error detection circuitries.

33. The method of claim 32, wherein the method includes buffering data for the second error detection circuitry with a data buffer coupled to the data transfer circuitry and to the second error detection circuitry.

34. The method of claim 28, wherein the method includes correcting, with the second error detection circuitry, one or more errors in the data received from the memory interface.

35. The method of claim 28, wherein the method includes transferring the data received from the host interface, the error detection data, and the error correction data across the memory interface.

36. The method of claim 28, wherein the method includes receiving, with data transfer circuitry coupled to the memory interface and to the first and the second error detection circuitries, data and corresponding error detection data from the memory interface; and
transferring, with data transfer circuitry, the data and the corresponding error detection data to the first error detection circuitry.

37. The method of claim 36, wherein calculating with the first error detection circuitry includes calculating error detection data for the data received from the data transfer circuitry; and
wherein the method includes comparing, with the first error detection circuitry, the calculated error detection data for the data received from the data transfer circuitry to the corresponding error detection data received from the data transfer circuitry.

38. The method of claim 36, wherein receiving includes receiving with the data transfer circuitry coupled to more than one channel and to channel data transfer circuitry, wherein the channel data transfer circuitry is coupled to a data buffer and to the second error detection circuitry; and wherein receiving includes receiving with the data transfer circuitry coupled to the memory interface, which is coupled to error detection memory.

39. The method of claim 36, wherein receiving includes receiving with the data transfer circuitry coupled to more than one channel and to a channel processor and a channel memory.

40. The method of claim 28, wherein the method includes processing, with encryption circuitry coupled to a host buffer that is coupled to the host interface, the data optionally for providing an encrypted output.

41. The method of claim 40, wherein processing includes processing with the encryption circuitry comprising an advanced encryption standard (AES) engine.

42. A method for operating a memory controller, comprising:
calculating, with front end error detection circuitry coupled to a host interface, first error detection data for corresponding data;
calculating, with back end error detection circuitry coupled to a memory interface, second error detection data for the corresponding data; and
comparing, with the back end error detection circuitry, the first error detection data with the second error detection data to check integrity of the corresponding data.

43. The method of claim 42, wherein the method includes:
transferring the first error detection data from the front end error detection circuitry to a back end error detection memory via data transfer circuitry coupled to the front end error detection circuitry and to the back end error detection memory; and
comparing, with the back end error detection circuitry, the first error detection data from the error detection memory with the second error detection data to check integrity of the corresponding data.

44. The method of claim 42, wherein:
the front end error detection circuitry comprises a cyclic redundancy check (CRC) engine;
the back end error detection circuitry comprises a CRC engine; and
the method includes calculating, with an error correction code (ECC) engine coupled to the back end error detection circuitry and to the memory interface, error correction data from the corresponding data.

45. The method of claim 44, wherein the method includes transferring the error correction data and the corresponding data across the memory interface without the first and/or the second error detection data.

46. The method of claim 42, wherein:
the corresponding data comprises a direct memory access (DMA) payload;
calculating, with the front end error detection circuitry, comprises calculating first error detection data per sector of the DMA payload; and
calculating, with the back end error detection circuitry, comprises calculating second error detection data per sector of the DMA payload.

47. A method for operating a memory system, comprising:
calculating, with front end error detection circuitry in a memory controller coupled to one or more solid state memory devices, first error detection data for a sector of data;
calculating, with back end error detection circuitry in the memory controller, second error detection data for the sector of data;
checking integrity, with back end error detection circuitry, of the sector of data;

storing the sector of data without the first and/or the second error detection data in the one or more solid state memory devices.

48. The method of claim 47, wherein the method includes comparing, with the back end error detection circuitry comprising a cyclic redundancy check (CRC) engine, the first error detection data with the second error detection data to check integrity of the sector of data.

49. The method of claim 47, wherein operating the memory system includes operating a physical interface coupled to a host interface of the memory controller.

50. The method of claim 49, wherein the front end error detection circuitry comprises a cyclic redundancy check (CRC) engine coupled to the host interface by a link layer and/or a transport layer.

51. The method of claim 49, wherein the physical interface comprises a serial interface selected from the group of serial interfaces including:

universal serial bus (USB);
serial advanced technology attachment (SATA); and
peripheral component interconnect express (PCIe).

52. The method of claim 47, wherein the method includes calculating, with an error correction code (ECC) engine coupled to the back end error detection circuitry and to a memory interface, error correction data for the sector of data.

53. The method of claim 52, wherein storing comprises storing the sector of data and the error correction data without the error detection data in the one or more solid state memory devices when the first error detection data matches the second error detection data.

54. The method of claim 47, wherein the method includes comparing, with the front end error detection circuitry, the first error detection data with the second error detection data to check integrity of the sector of data.

\* \* \* \* \*